United States Patent
Hong et al.

(10) Patent No.: US 8,180,929 B2
(45) Date of Patent: May 15, 2012

(54) METHOD FOR MANAGING LOGICAL ADDRESS AND DEVICE THEREOF

(75) Inventors: Jin-woo Hong, Suwon-si (KR);
Seung-seop Shim, Anyang-si (KR);
Dae-gyu Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 11/927,942

(22) Filed: Oct. 30, 2007

(65) Prior Publication Data

US 2008/0270632 A1    Oct. 30, 2008

Related U.S. Application Data

(60) Provisional application No. 60/913,607, filed on Apr. 24, 2007.

(30) Foreign Application Priority Data

Jul. 6, 2007  (KR) .................. 10-2007-0068292

(51) Int. Cl.
*G06F 3/00*   (2006.01)
*G06F 12/02*  (2006.01)

(52) U.S. Cl. ................. 710/9; 710/3; 711/1

(58) Field of Classification Search .......... None
See application file for complete search history.

(56) References Cited

U.S. PATENT DOCUMENTS

| | | | |
|---|---|---|---|
| 4,145,745 A * | 3/1979 | De Bijl et al. ................ | 711/4 |
| 5,828,899 A * | 10/1998 | Richard et al. ................ | 710/8 |
| 6,189,050 B1 * | 2/2001 | Sakarda ........................ | 710/18 |
| 6,389,491 B1 | 5/2002 | Jacobson et al. | |
| 6,976,105 B1 * | 12/2005 | Wright .......................... | 710/104 |
| 2002/0126000 A1 * | 9/2002 | Shintani et al. ........... | 340/310.01 |
| 2002/0161844 A1 * | 10/2002 | Overtoom ..................... | 709/208 |
| 2003/0135709 A1 | 7/2003 | Niles et al. | |
| 2003/0200477 A1 * | 10/2003 | Ayres ............................. | 714/2 |
| 2003/0229900 A1 | 12/2003 | Reisman | |
| 2004/0199703 A1 * | 10/2004 | Wurth et al. ................. | 710/306 |
| 2005/0021717 A1 * | 1/2005 | Tomizawa .................... | 709/223 |
| 2005/0160471 A1 * | 7/2005 | Cohen .......................... | 725/116 |

(Continued)

FOREIGN PATENT DOCUMENTS

JP   5244161 A   9/1993

(Continued)

OTHER PUBLICATIONS

Hitachi et al.: "HDMI Specification Version 1.3a" [Online], dated Nov. 10, 2006, XP002476103, pp. 8-139.

(Continued)

*Primary Examiner* — Henry Tsai
*Assistant Examiner* — Michael Sun
(74) *Attorney, Agent, or Firm* — Sughrue Mion, PLLC (57) ABSTRACT

An address management method and a device thereof are provided. The address management method includes checking by a device whether logical addresses are currently being used by external devices; and setting by the device a non-use logical address as a logical address of the device regardless of the type of the device, if the device determines that the non-use logical address exists. Therefore, a device may use all logical addresses regardless of its device type, and may also have a logical address even though all logical addresses corresponding to its device type are currently being used.

14 Claims, 5 Drawing Sheets

U.S. PATENT DOCUMENTS

| | | | |
|---|---|---|---|
| 2006/0035629 A1* | 2/2006 | Kodama et al. | 455/415 |
| 2006/0184823 A1* | 8/2006 | Matsuki et al. | 714/12 |
| 2006/0224818 A1* | 10/2006 | Stewart | 711/103 |
| 2006/0248158 A1* | 11/2006 | Ha et al. | 709/208 |
| 2007/0011712 A1* | 1/2007 | White et al. | 725/112 |
| 2008/0080521 A1* | 4/2008 | Sichner et al. | 370/400 |
| 2008/0120488 A1* | 5/2008 | Woo et al. | 711/209 |
| 2009/0210539 A1* | 8/2009 | Funabiki et al. | 709/228 |

FOREIGN PATENT DOCUMENTS

| | | |
|---|---|---|
| KR | 1020060021513 A | 3/2006 |
| KR | 1020070036892 A | 4/2007 |

OTHER PUBLICATIONS

Whole Supplement 1: "Consumer Electronics Control (CEC)," Supplement to HDMI Specification Version 1.3a, HDMI Licensing, LLC, cover page, i-vii, 1-97, Nov. 10, 2006.

* cited by examiner

CEC Table 5 Logical Addresses

| Logical Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

<Report Physical Address>
-[Physical Address]
-[Device type]
  -TV:0
  -Recording Device:1
  -Reserved:2
  -Tuner:3
  -Playback Device:4
  -Audio System:5

FIG. 5C

<Report Physical Address>
-[Physical Address]
-[Device type]
  -[Device type Subfield]
    -TV:0
    -Recording Device:1
    -Reserved:2
    -Tuner:3
    -Playback Device:4
    -Audio System:5
  -[Internal Address Subfield]
-[Device Name]

FIG. 6A

| START | SOURCE ADDRESS | DESTINATION ADDRESS | OPCODE | PHYSICAL ADDRESS | DEVICE TYPE | | | | | | | |
|---|---|---|---|---|---|---|---|---|---|---|---|---|
| | 1 | 0 | 0x84 | 1.2.2.3 | 0 | 0 | 0 | 0 | 0 | 0 | 0 | 1 |
| | 3 | 0 | 0x84 | 1.2.2.3 | 0 | 0 | 0 | 0 | 0 | 0 | 1 | 1 |
| | 5 | 0 | 0x84 | 1.2.2.3 | 0 | 0 | 0 | 0 | 0 | 1 | 0 | 1 |

FIG. 6B

| START | SOURCE ADDRESS | DESTINATION ADDRESS | OPCODE | PHYSICAL ADDRESS | DEVICE TYPE | | | | | | | |
|---|---|---|---|---|---|---|---|---|---|---|---|---|
| | 1 | 0 | 0x84 | 1.2.2.3 | 0 | 0 | 1 | 0 | 1 | 0 | 1 | 0 |

FIG. 6C

| START | SOURCE ADDRESS | DESTINATION ADDRESS | OPCODE | PHYSICAL ADDRESS | INTERNAL ADDRESS | | | | | DEVICE TYPE | | |
|---|---|---|---|---|---|---|---|---|---|---|---|---|
| | 1 | 0 | 0x84 | 1.2.2.3 | 0 | 0 | 0 | 0 | 0 | 0 | 1 | 1 |
| | 1 | 0 | 0x84 | 1.2.2.3 | 0 | 0 | 0 | 0 | 1 | 0 | 1 | 1 |
| | 1 | 0 | 0x84 | 1.2.2.3 | 0 | 0 | 1 | 0 | 0 | 0 | 1 | 1 |

METHOD FOR MANAGING LOGICAL ADDRESS AND DEVICE THEREOF

CROSS-REFERENCE TO RELATED APPLICATIONS

This application claims priority from U.S. Provisional Application No. 60/913,607, field Apr. 24, 2007, in the United States Patent and Trademark Office, and Korean Patent Application No. 10-2007-0068292, field Jul. 6, 2007, in the Korean Intellectual Property Office, the disclosure of which are incorporated herein by reference in their entireties.

BACKGROUND OF THE INVENTION

1. Field of the Invention

Apparatuses and methods consistent with the present invention relate to managing addresses, and more particularly, to managing logical addresses in order to support a greater number of logical addresses of connected devices.

2. Description of the Related Art

Figure 1:
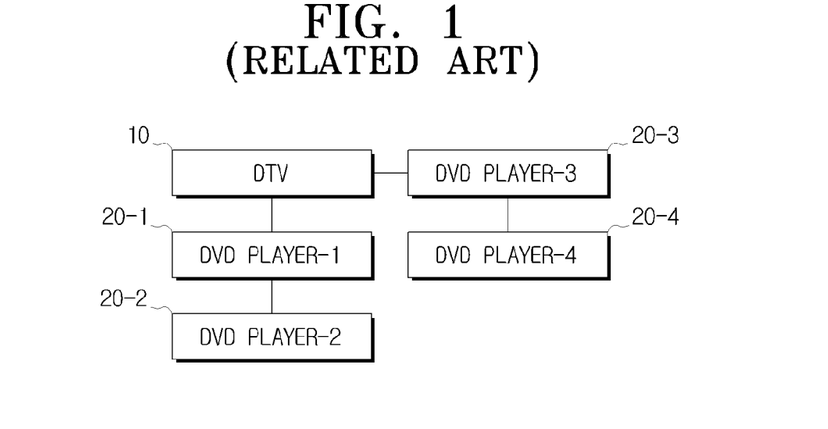
FIG. 1 is a diagram of a video system connected according to an HDMI CEC specification.

FIG. 1 shows a video system connected according to a high definition multimedia interface (HDMI) consumer electronics control (CEC) specification. The video system of FIG. 1 is constituted by connecting a digital television (DTV) 10 to digital versatile disc (DVD) players 20-1 to 20-4 according to the HDMI CEC specification.

Not only video signals but also control signals are transceived between the DTV 10 and the DVD players 20-1 to 20-4. Accordingly, the DTV 10 and the DVD players 20-1 to 20-4 need to have unique logical addresses.

However, only a limited number of logical addresses are provided on the HDMI CEC specification. Additionally, logical addresses are pre-allocated according to the type of device.

Figure 2:
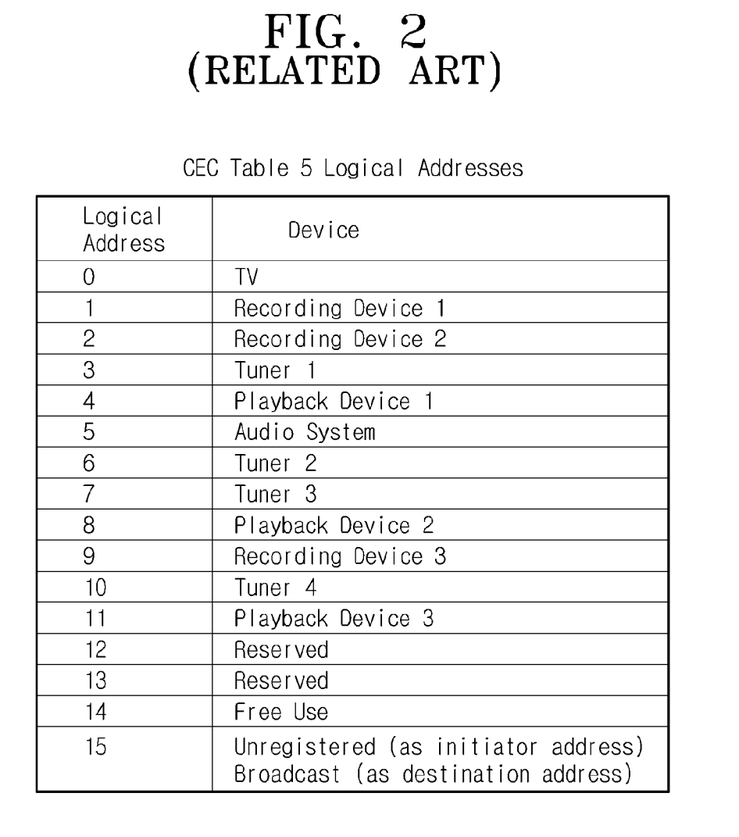
FIG. 2 is a table of logical addresses according to the HDMI CEC specification.

FIG. 2 shows logical addresses according to the HDMI CEC specification. In other words, each unique logical address is allocated to each source according to the type of source.

Referring to FIG. 2, if the DVD players are playback devices, logical addresses "4", "8" and "11" are sequentially allocated to the DVD players.

In other words, if the DVD players of FIG. 1 are sequentially connected, logical addresses "4", "8" and "11" may be allocated to the first DVD player 20-1, the second DVD player 20-2 and the third DVD player 20-3, respectively.

However, if there is no logical address to be allocated to the fourth DVD player 20-4, unregistered logical address "15" may be allocated to the fourth DVD player 20-4, causing the fourth DVD player 20-4 to be inactivated.

In greater detail, logical addresses can support only three recording devices, four tuners, three playback devices and one audio system, and thus it is impossible to support a greater number of devices other than those listed above.

Additionally, a DVD receiver has both a playback function and an audio function, so both logical address "4" indicating the playback function and logical address "5" indicating the audio function may be allocated to the DVD receiver. In other words, two or more logical addresses are required even though a single device is physically provided. Consequently, a single logical address indicating the audio function is provided even when two or more DVD receivers are connected, which makes it impossible to use an audio function of a DVD receiver later connected.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention is to support a greater number of devices using a greater number of addresses.

The present invention provides an address management method and a device thereof, in which the device sets a non-use logical address as its logical address, regardless of the type of the device, instead of searching for and setting a logical address corresponding to the type of the device as its logical address according to the HDMI CEC specification, so that a greater number of devices can be supported.

According to an aspect of the present invention, there is provided address management method comprising checking by a device whether logical addresses are currently being used by external devices; and setting by the device a non-use logical address as a logical address of the device regardless of the type of the device, if the device determines that the non-use logical address exists.

Each logical address may be allocated to each device.

The external devices may be connected according to the HDMI CEC specification.

The method may further comprise transmitting by the device a message comprising a physical address field and a device type field, after setting the logical address.

The device type field may have a data structure capable of storing device type data in various formats.

The data structure may comprise a bitmap structure.

The device type field may comprise a device type subfield which stores device type information; and an internal address subfield which stores unique identifications (IDs) in order to distinguish several devices of the same type.

The device type field may further comprise a device name field which stores device names.

The checking may be repeated sequentially from logical address "0" to a predetermined logical address, or to a non-use logical address.

The predetermined logical address may comprise a logical address 15.

The checking may comprise transmitting by the device polling messages to the external devices, at the logical addresses; and determining that the corresponding logical addresses are currently being used, if an acknowledge (ACK) packet is received from one of the external devices as a response to the polling messages.

According to another aspect of the present invention, there is provided a device comprising an interface which enables the device to be connected to an external device; and a controller which checks whether logical addresses are currently being used by external devices, and which sets a non-use logical address as a logical address of the device regardless of the type of the device, if the device determines that the non-use logical address exists.

The external devices may be connected according to the HDMI CEC specification.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 3:
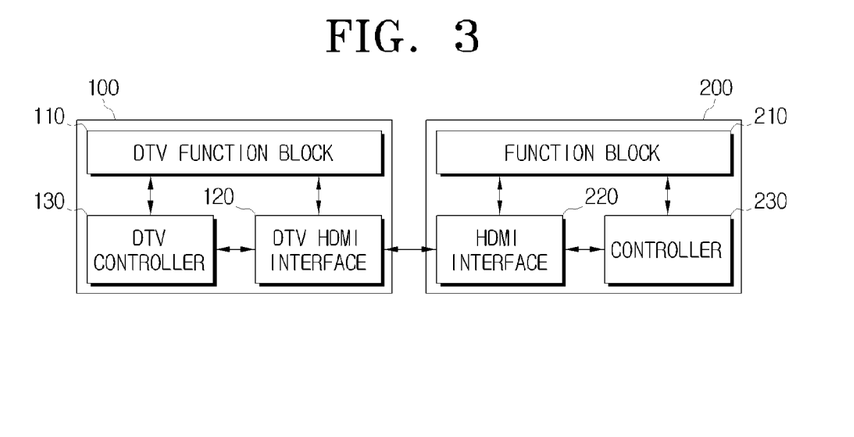
FIG. 3 is a block diagram of a video system to which the present invention is applicable.

FIG. 3 is a block diagram of a video system according to an exemplary embodiment of the present invention. The video system of FIG. 3 is constituted by connecting a DTV 100 to an audio/video (AV) device 200 according to the HDMI CEC specification.

As shown in FIG. 3, the DTV 100 comprises a DTV function block 110, a DTV HDMI interface 120, and a DTV controller 130.

The DTV function block 110 performs the original function of the DTV. Specifically, the DTV function block 110 performs signal processing such as decoding and scaling with respect to a broadcast signal received from a broadcasting station wirelessly or via a cable, and displays the processed broadcast signal on a display so that a user can view a broadcast screen. The DTV function block 110 may display video corresponding to a video signal received from the AV device 200 through the DTV HDMI interface 120 on a display.

The DTV HDMI interface 120 is connected to the AV device 200 according to the HDMI CEC specification, so that video signals and messages can be transmitted and received between the DTV 100 and the AV device 200.

The DTV controller 130 controls the operation of the DTV function block 110 according to a user command. The DTV controller 130 may also control the AV device 200 by sending a control command to the AV device 200 through the DTV HDMI interface 120.

Additionally, the DTV controller 130 searches for the AV device 200 connected through the DTV HDMI interface 120, to obtain the logical address and the physical address of the AV device 200.

The AV device 200 of FIG. 3 comprises a function block 210, an HDMI interface 220, and a controller 230.

The function block 210 performs original functions of the AV device 200. For example, if the AV device 200 is a playback device, the function block 210 may read a video signal recorded in a recording medium mounted therein, and may provide the read video signal to the DTV 100 through the HDMI interface 220.

The HDMI interface 220 is connected to the DTV 100 according to the HDMI CEC specification, so that video signals and messages can be transmitted and received between the DTV 100 and the AV device 200.

The controller 230 controls the operation of the function block 210 in response to the control command of the DTV controller 130 which is transmitted through the HDMI interface 220. If the AV device 200 is connected to the DTV 100, the controller 230 may acquire its logical address using the HDMI interface 220.

Hereinafter, a process for allocating logical addresses of the AV device 200 in the video system of FIG. 3 will be described in detail with reference to FIG. 4.

Figure 4:
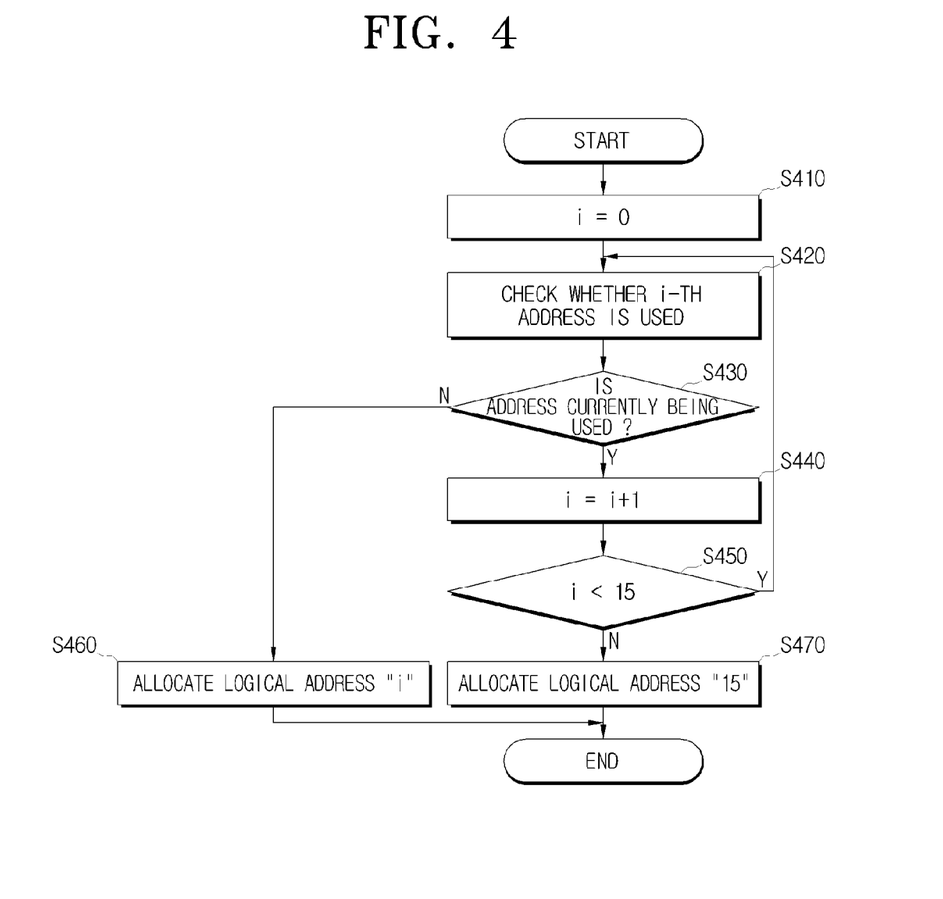
FIG. 4 is a flowchart explaining an address management method according to an exemplary embodiment of the present invention.

FIG. 4 is a flowchart explaining a method by which the AV device 200 acquires its logical address in a network, according to an exemplary embodiment of the present invention.

The controller 230 of the AV device 200 checks whether logical addresses are sequentially used from the zeroth address (S410).

Specifically, if the controller 230 of the AV device 200 transmits a polling message at the zeroth address, since it is assumed that the DTV 100 is also connected to the network, the AV device 200 may receive an acknowledge (ACK) packet from the DTV 100 (S420).

Therefore, if the controller 230 detects that the zeroth address is currently being used by another device (S430-Y), the controller 230 may search for the next address, that is, a first address (S440).

Since only logical addresses "0" to "15" defined according to the HDMI CEC specification are used in the exemplary embodiment of the present invention, the above operations may be performed from the zeroth address to the fifteenth address (S450).

If all logical addresses "0" to "14" are currently being used by other devices in the network, the AV device 200 may stop searching for a logical addresses, and thus logical address "15" may be allocated to the AV device 200 (S470).

Returning to operation S420, if the controller 230 of the AV device 200 transmits a polling message at the first logical address, since it is assumed that no devices other than the DTV 100 are connected to the network, the AV device 200 cannot receive an ACK packet (S420).

Therefore, the AV device 200 recognizes that the first logical address is currently not in use (S430-N).

Subsequently, non-use logical address "1" is allocated to the AV device 200 as a logical address of the AV device 200 (S460). That is, non-use logical address indicates which is not used by any one of the external devices.

Figure 5A:
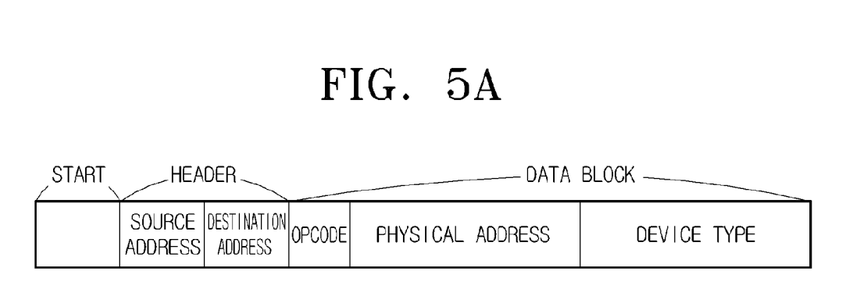
FIG. 5A is a diagram showing a physical address reporting packet in a related art manner.

FIG. 5A is a diagram of a message structure according to an exemplary embodiment of the present invention. As shown in FIG. 5, the message comprises a start bit which indicates the start of the message, a header block which indicates logical addresses of a source and a destination, and a data block which comprises data to be transmitted and OPCODE. In particular, a Report Physical Address message is transmitted through the data block.

Figure 5B:
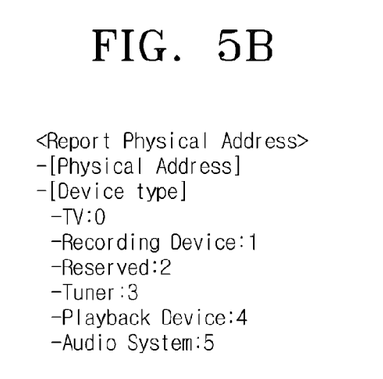
FIGS. 5B and 5C are diagrams showing physical address reporting packets according to exemplary embodiments of the present invention.

FIG. 5B is a diagram of the Report Physical Address message structure according to an exemplary embodiment of the present invention.

As shown in FIG. 5B, the Report Physical Address message may be divided into a Physical Address field and a Device type field. The Device type field comprises data regarding the type of a AV device. For example, if the AV device is a TV, data "0" may be stored, if the AV device is a recording device, data "1" may be stored, and if the AV device is a tuner, data "3" may be stored.

Hereinafter, the Report Physical Address message structure shown in FIG. 5B will be described in detail with reference to FIGS. 6A and 6B.

If the AV device 200 may be a tuner, an audio system and a recording device, the corresponding device needs to have information regarding these three device types.

Figure 6A:
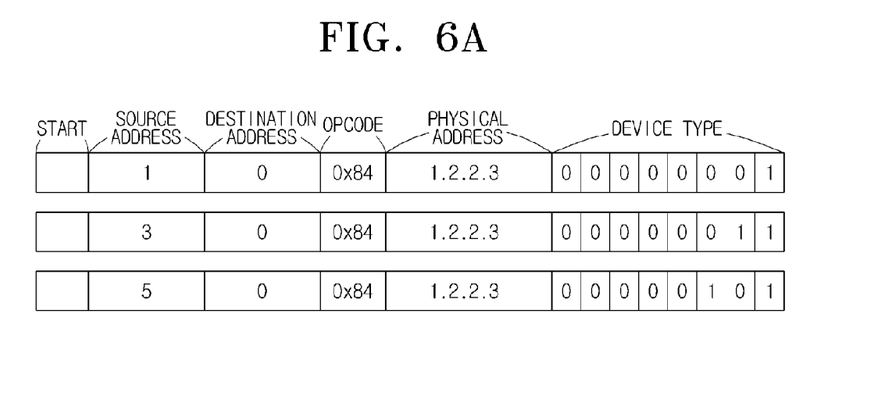
FIGS. 6A to 6C are diagrams showing situations in which the physical address reporting packets are used according to exemplary embodiments of the present invention.

FIG. 6A shows a physical address reporting packet when the Report Physical Address messages of FIGS. 5A and 5B are stored in a related art manner. In other words, according to the related art manner, a corresponding AV device needs to have a logical address corresponding to the type of device. Referring to FIG. 2, logical address "1" corresponding to a recording device, logical address "3" corresponding to a tuner, and logical address "5" corresponding to an audio system may be allocated to each device. Additionally, the OPCODE may have a value of 0X84 indicating the Report Physical Address message.

In addition, the values "1", "3" and "5" indicating a recording device, a tuner and an audio system, respectively, need to be recorded in the Device type field according to the message structure defined in FIG. 5B.

Accordingly, if the AV device 200 attempts to send device type information to the DTV 100, the three messages shown in FIG. 6A need to be transmitted.

Figure 6B:
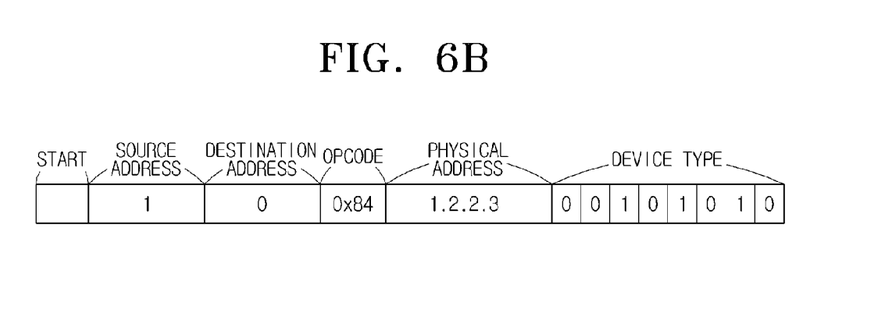

FIG. 6B shows a physical address reporting packet when the Report Physical Address messages of FIGS. 5A and 5B are stored using a method according to the exemplary embodiment of the present invention. In other words, in the method according to the exemplary embodiment of the present invention, a non-use logical address is allocated to a corresponding AV device 200, regardless of the type of device. For example, if the DTV 100 has logical address "0", the AV device 200 may need only one logical address "1" regardless of its device type. Additionally, the values "1", "3" and "5" indicating a recording device, a tuner and an audio system, respectively, need to be recorded in the Device type field. In this situation, if the values are stored in a bitmap format instead of the device type storing method as shown in FIG. 6A, only one message such as one shown in FIG. 6B may be transmitted to inform the DTV 200 the device type of the AV device 200.

Specifically, the values corresponding to the first, third and fifth bits are not stored separately in binary form, and so the first, third and fifth bits may all have a value of "1" instead of "0". Therefore, the values corresponding to the first, third and fifth bits can be stored only once.

Figure 5C:
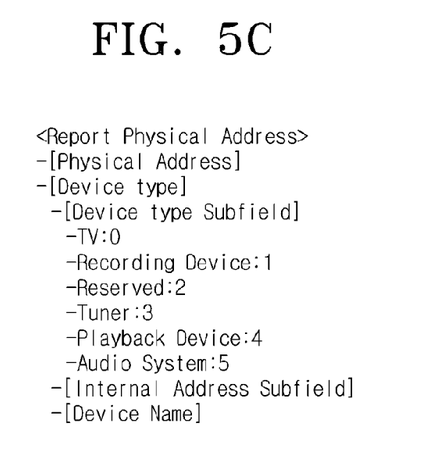
Figure 6C:
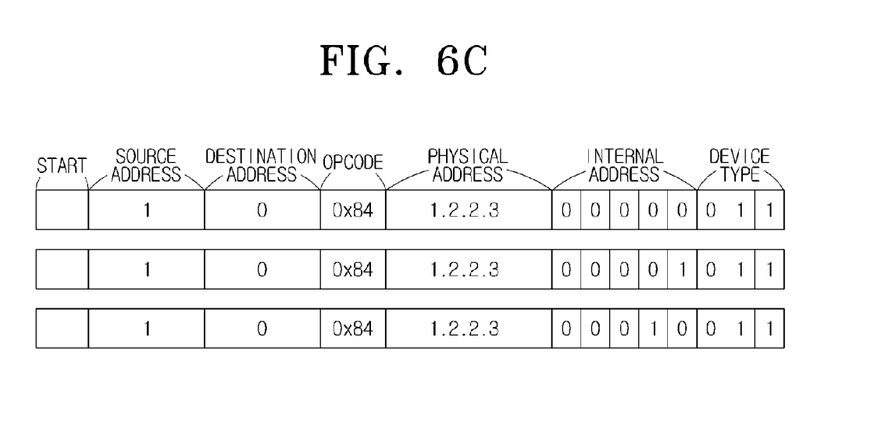

FIG. 5C shows a message structure according to another exemplary embodiment of the present invention, and FIG. 6C shows a physical address reporting packet in the message structure of FIG. 5C.

In the case of the message structure of FIG. 5B, data regarding various types of device may be stored in a single field. However, if several devices of the same type exist, the message structure of FIG. 5C may be used.

In FIG. 5C, the Report Physical Address message may be divided into a Physical Address field and a Device type field. In particular, the Device type field comprises a Device type Subfield which stores the device type information, an Internal Address Subfield which stores unique IDs in order to distinguish several devices of the same type, and a Device Name field which stores device names.

For example, if the AV device 200 includes digital video broadcasting (DVB) tuner, an Advanced Television Systems Committee (ATSC) tuner and a national Television Standards Committee (NTSC) tuner, logical address "1" may be set as logical addresses of all the tuners regardless of the type of device according to an exemplary embodiment of the present invention. Additionally, since the type of device also indicates a tuner, a value of "3" may be recorded in all the Device type Subfield. At this time, if each ID is internally assigned according to the type of device, devices of the same type may be used.

Specifically, referring to FIG. 6C, the same source address (namely, "1") and the same Device type Subfield (namely, "3") are stored in the three messages, but the internal addresses "0", "1" and "2" distinguishes three tuners. Accordingly, each tuner may be distinguished in the DTV 100.

Additionally, the Device Name field stores device names using character strings, and thus it is possible to use the names in a user interface (UI) of a system, or to distinguish names for each device.

So far, processes, by which an AV device sets only one logical address regardless of its device type in order to ensure a greater number of logical addresses for other devices, have been described in detail according to the exemplary embodiments of the present invention.

Although the video system is configured by connecting the DTV and the DVD players in the exemplary embodiment of the present invention, the present invention is applicable to a video system including other video devices. Other devices to which the present invention may apply comprise a personal video recorder (PVR), a hard disk drive (HDD) player, a blu-ray disk (BD) recorder, a video cassette recorder (VCR), a home theatre system, a personal multimedia player (PMP), a digital camcorder, or so forth.

The logical addresses "0" to "15" are sequentially searched and the searched logical address is then allocated to the device in the exemplary embodiment of the present invention, but the present invention is not limited thereto.

Additionally, according to an exemplary embodiment of the present invention, only one logical address may be selected from among the logical addresses corresponding to the type of device and the selected address may then be set as a logical address for the device.

According to the exemplary embodiments of the present invention, the video devices are connected according to the HDMI CEC specification to facilitate understanding of the present invention. However, the present invention may be applicable to schemes other than the HDMI CEC specification for transceiving video signals and messages between video devices.

In the following, other exemplary embodiments of the present invention are described in detail with reference to FIGS. 7 and 8.

Figure 7:
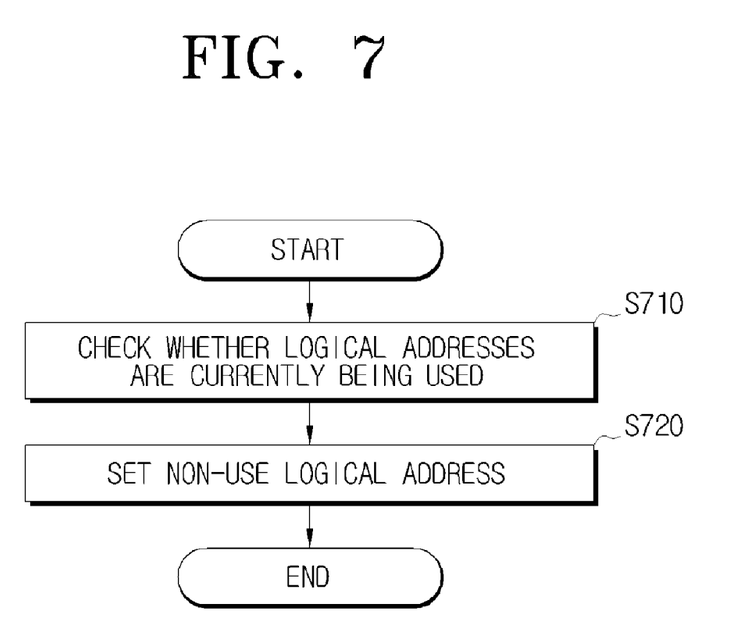
FIG. 7 is a flowchart explaining an address management method according to another exemplary embodiment of the present invention.

According to an address management method of FIG. 7, a device checks whether logical addresses are currently being used by external devices or not (S710). If a non-use logical address exists, the device may set the non-use logical address as its logical address, regardless of the type of the device (S720).

Figure 8:
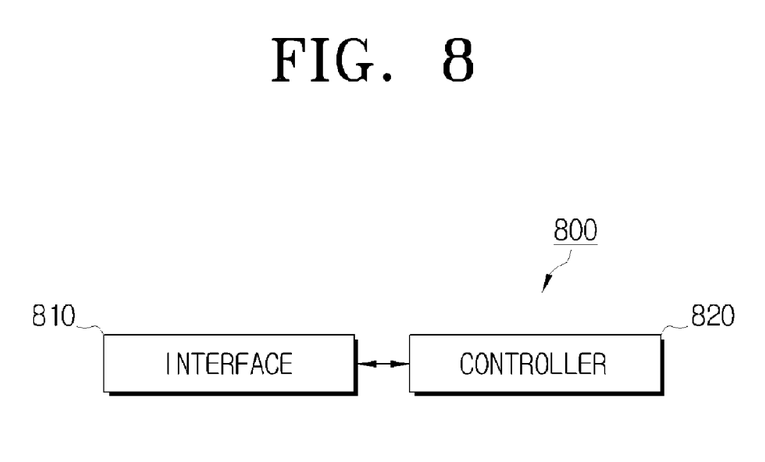
FIG. 8 is a block diagram of a device according to another exemplary embodiment of the present invention.

As shown in FIG. 8, a device 800 according to another exemplary embodiment of the present invention comprises an interface 810 and a controller 820. The interface 810 is connected to external devices so that communication with the external devices can be performed. The controller 820 checks whether logical addresses are currently being used by external devices or not. If a non-use logical address exists, the controller 820 may set the non-use logical address as a logical address of the device, regardless of the type of the device 800.

As described above, according to the exemplary embodiments of the present invention, it is possible to support a greater number of devices using a greater number of addresses. Specifically, a device may set a non-use logical address as its logical address regardless of the type of the device, instead of searching for and setting a logical address corresponding to the type of the device as its logical address according to the HDMI CEC specification. Accordingly, a greater number of devices can be supported.

The foregoing embodiments and advantages are merely exemplary and are not to be construed as limiting the present invention. The present teaching can be readily applied to other types of devices. Also, the description of the exemplary embodiments of the present invention is intended to be illustrative, and not to limit the scope of the claims, and many alternatives, modifications, and variations will be apparent to those skilled in the art.

What is claimed is:

1. An address management method comprising:
   sequentially checking numbered logical addresses in numerical order to determine whether the logical addresses are currently being used by external devices associated with a first device; and
   ceasing to check the numbered logical addresses upon identifying one unused logical address and setting the unused logical address as the only logical address of the first device regardless of a type of the first device, wherein the external devices are connected to the first device according to a high definition multimedia interface (HDMI) consumer electronics control (CEC) specification,
   wherein the HDMI CEC specification provides a limited number of logical addresses,
   wherein the logical address is a single logical address and includes a device type field indicating a plurality of different types of devices.

2. The method as claimed in claim 1, wherein each of the external devices is allocated a single unique logical address.

3. The method as claimed in claim 1, further comprising transmitting by the first device a message comprising a physical address field and a device type field, after setting the logical address.

4. The method as claimed in claim 3, wherein the first device is identified as a plurality of different device types according to the HDMI CEC specification, and wherein the plurality of device types are identified in the device type field.

5. The method as claimed in claim 4, wherein each of the plurality of device types is identified by using one of plural bits constituting the device type field.

6. The method as claimed in claim 3, wherein the device type field has a data structure capable of storing device type data in various formats.

7. The method as claimed in claim 6, wherein the data structure comprises a bitmap structure.

8. The method as claimed in claim 3, wherein the device type field comprises:
   a device type subfield which stores device type information; and
   an internal address subfield which stores identifications (IDs) in order to distinguish several devices of a same type.

9. The method as claimed in claim 3, wherein the device type field further comprises a device name field which stores device names.

10. The method as claimed in claim 1, wherein the checking is repeated sequentially with respect to a first logical address having a logical address number "0" to a predetermined-numbered logical address, or until the non-use logical address is identified.

11. The method as claimed in claim 10, wherein the predetermined-logical address is a sixteenth logical address having a logical address number "15".

12. An address management method comprising:
   sequentially checking numbered logical addresses in numerical order to determine whether the logical addresses are currently being used by external devices associated with a first device; and
   ceasing to check the numbered logical addresses upon identifying one unused logical address, and setting the unused logical address as the only logical address of the first device regardless of a type of the first device,
   wherein the checking comprises:
   transmitting a polling message to at least one of the external devices with respect to the logical address; and
   determining whether the logical address is currently being used by any one of the external devices based on whether an acknowledge (ACK) packet is received from one of the external devices as a response to the polling message,
   wherein the logical address is a single logical address and includes a device type field indicating a plurality of different types of devices.

13. The method as claimed in claim 1, wherein the first device is identified as a plurality of device types according to the HDMI CEC specification, and
   wherein the logical address is configured to define the plurality of device types.

14. A first device comprising:
   an interface which enables the first device to be connected to an external device; and
   a controller which sequentially checks numbered logical addresses in numerical order to determine whether the logical addresses are currently being used by external devices, and which ceases to check the numbered logical addresses upon identifying one unused logical address, and which sets the unused logical address as the only logical address of the first device regardless of a type of the first device, wherein the external devices are connected according to a high definition multimedia interface (HDMI) consumer electronics control (CEC) specification,
   wherein the HDMI CEC specification provides a limited number of logical addresses,
   wherein the logical address is a single logical address and includes a device type field indicating a plurality of different types of devices.

* * * * *